F. J. PRICE.
APPARATUS FOR ISSUING OR DISTRIBUTING CARDS, TOKENS, AND GOODS.
APPLICATION FILED AUG. 28, 1911. RENEWED JULY 25, 1912.
1,053,534.
Patented Feb. 18, 1913.
2 SHEETS—SHEET 2.
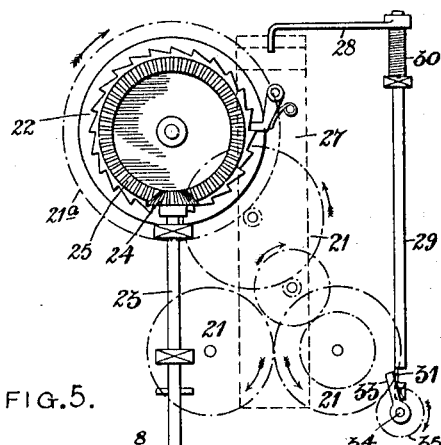
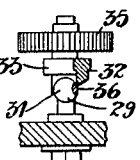
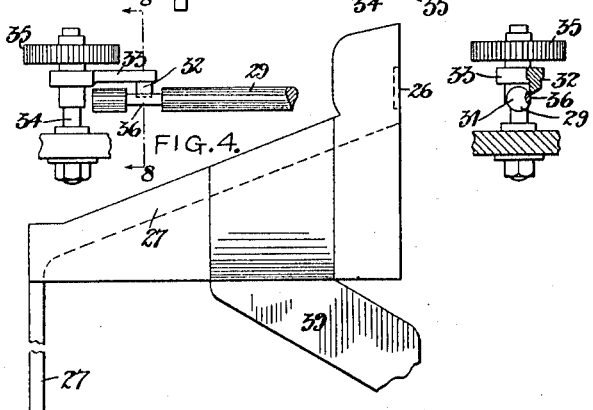
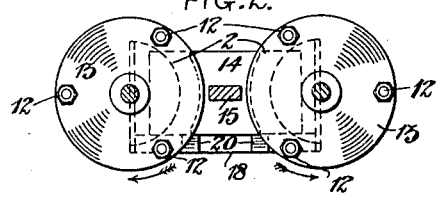

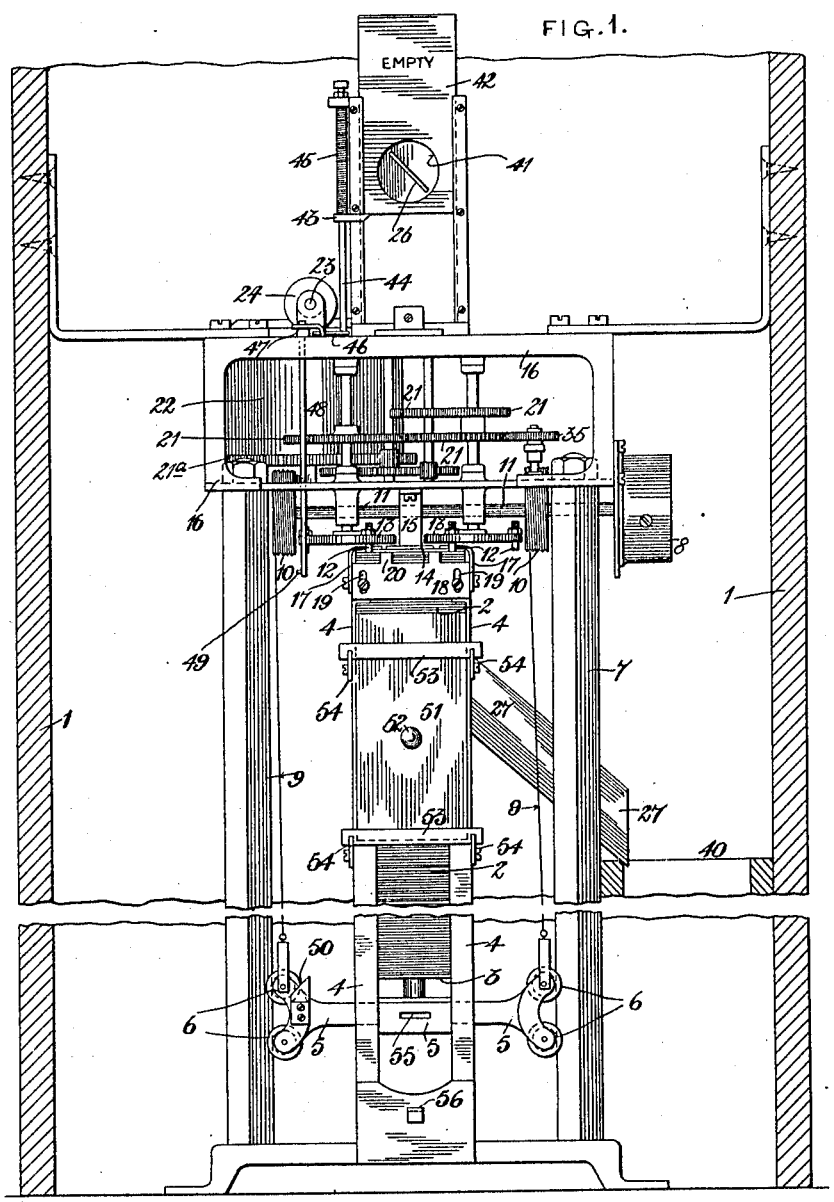

UNITED STATES PATENT OFFICE.

FOSTER JAMES PRICE, OF UPTON PARK, ENGLAND.

APPARATUS FOR ISSUING OR DISTRIBUTING CARDS, TOKENS, AND GOODS.

1,053,534.   Specification of Letters Patent.   Patented Feb. 18, 1913.

Application filed August 28, 1911, Serial No. 646,379. Renewed July 25, 1912. Serial No. 711,575.

*To all whom it may concern:*

Be it known that I, FOSTER JAMES PRICE, a subject of the King of England, residing at Upton Park, in the county of Essex, England, have invented certain new and useful Improvements in Apparatus for Issuing or Distributing Cards, Tokens, and Goods, of which the following is a specification.

This invention relates to apparatus for issuing tickets, cards, tokens or the like adapted to be operated either by an attendant at the entrance of a place of entertainment, etc., or of being combined with automatic vending apparatus whereby the insertion of a coin or coins into a locked receptacle automatically brings about the delivery of certain goods.

The object of the invention is to provide apparatus of a very simple character which will insure the successive delivery of each of a number of articles without liability of damaging the cards, goods or other articles and adapted to deliver individual articles or a plurality of articles or goods of widely varying thickness.

According to the present invention I provide an ejector constituted by a pair of rotary disks or turning elements geared together and each furnished with a pin or projection which projects at right angles to the plane of the articles successively presented to them so that as the disks are rotated the impact of the pins on the edges of the articles to be delivered (or the packets in which they are enveloped) will expel the articles at any speed desired. The disks carrying the pins or projections for expelling the articles are mounted on shafts at either side of the delivery aperture and the pins are adjustably secured in positions adjacent to the periphery of the disks so as to project more or less from the faces thereof in a position when the disks are rotated such that they will come into contact with the edges of the articles and cause them to be expelled. An ejector in this form while suitable for use with delivery mechanism for dealing with packets and such like articles having considerable thickness is specially adapted to the delivery of tickets which are necessarily very thin and have to be delivered one by one.

An embodiment of the invention is shown in the accompanying drawings, in which—

Figure 1 is a front elevation of the apparatus, partly broken away and shown as contained within a casing which is shown in section; Fig. 2 is a detail plan view of the ejecting disks and appurtenant parts; Fig. 3 is a detail plan view of a spring motor with winding gear and coin trip or escapement mechanism, also showing diagrammatically the gearing for driving the ejecting disks from said motor; Fig. 4 is a side view of a coin chute adapted for use in the machine; Fig. 5 is a detail view of the escapement mechanism and Fig. 6 is a section on the line 8—8 of Fig. 5.

In the machine illustrated, 1 designates the inclosing casing within which is contained the issuing or distributing mechanism or apparatus which in the case in question is combined with coin freed apparatus for the automatic delivery of the tickets 2 which are stacked within a container comprising vertical guiding members 4 within which is movable a base-plate 3 supported by a cross member 5, the outer ends of which are provided with pairs of grooved rollers 6 running on guiding members formed by vertical pillars 7 placed diagonally as shown to produce edges forming rails or ways for said rollers. The said rollers 6 and consequently the cross member 5 and base plate 3 are under the tension of a spring contained within a casing 8 the connection being effected for example by cords 9 connected to said cross member and adapted to be wound about helically grooved drums 10 carried by a shaft 11 acted on by the spring. By this means the tickets 2 are fed upwardly in the container so that the uppermost ticket is always brought into the path of the adjustable projections or pins 12 on the ejecting disks or turning elements 13, the upward movement of the tickets being limited by a plate 14 secured by a bracket 15 to the upper frame 16 of the apparatus, and further by curved lateral plates 17 which also tend to hold the tickets straight. The plate 14 may in some cases be dispensed with. It is preferred to mount the base plate 3 in the cross-member 5 so that it has a rocking or swiveling action thereon to prevent bending or jamming of the goods between said base plate and the upper plate 14 or lateral plates 17 or both. The plate 14 where such is used and the plates 17 when plate 14 is dispensed with form the upper lip of the discharge aperture, the lower lip of which is formed by a plate 18 adjustably mounted on the container as by pin and slot connections 19 and having two upwardly directed and curved projections 20. It will be obvious that by adjusting the plate 18 the width of the discharge aperture is varied to permit articles of different thickness to be discharged, or a plurality of said articles provided, the pin 12 of the disks 13 project sufficiently below the faces thereof to eject such plurality of articles. The said disks 13 together with the plate 18 are clearly shown in plan view in Fig. 2, from which it will be seen that each disk is provided with three pins 12 disposed at relative angles of 120 degrees, the pins shown as uppermost being those which will next act on the edge of the ticket 2 since the disks are driven in opposite directions as indicated by the arrows.

It is desirable when tickets or other articles are being delivered which would be liable to be damaged by the scratching of the pins 12 over the surface of the ticket or other article next below that being ejected to finish the point of the pin with a slight convexity and to polish it off.

Reference to Figs. 1 and 3 will show a suitable train of gearing 21 for effecting the desired movement of the disks, this gearing being driven from a spur wheel 21ᵃ operated by a spring contained within the casing 22, the spring being wound by a shaft 23 and bevel gear 24, 25 or in any other well known manner.

The automatic action of the machine may be effected by insertion of a coin at the aperture 26 whence it passes down the chute 27 on to a trip lever 28 carried by a shaft 29 under the action of a spring 30 at one end and whose other end is provided with an escapement gap 31 (Figs. 5 and 6) with which coacts a detent 32 carried by an arm 33 mounted on a shaft 34 provided with a pinion 35 in gear with one of the train of wheels 21 previously referred to as shown in Fig. 3. It will be obvious that in the normal position of the parts shown in said figure the disks 13 are arrested against movement but that on insertion of a correct coin or token the same trips the lever 28 thereby axially rotating the shaft 29 and allowing the detent 32 to traverse the gap 31 thus releasing the mechanism until the detent is again arrested by the solid portion 36 of the shaft, which shaft after each action by the coin is returned to normal position by the spring 30.

39 designates an auxiliary chute through which incorrect coins are returned to the purchaser or otherwise dealt with by any suitable detecting means, coins of correct diameter passing completely down the chute past the trip lever 28 into a cash drawer 40 or other receptacle.

In normal operation the coin aperture 26 is exposed through an opening 41 in a slide 42 supported by an arm 43 on a rod 44 under the action of a spring 45 tending to hold said arm under the slide and thus support same. The rod 44 is provided below with an arm 46 with which engages another arm 47 on a shaft 48 provided at its lower end with a lateral projection 49 adapted as the stock of tickets in the container becomes exhausted, to be engaged by a cam or inclined surface 50 on the cross member 5, whereby the shaft 48 is axially rotated, this in turn axially rotating the rod 44 through the arms 46 and 47 and causing the arm 43 to release the slide, thus allowing the latter to drop and obscure the aperture 26 at the same time bringing the word "Empty" or other suitable indication on the slide into view. It will be observed that this mechanism may be adjustable to allow the same to operate either when the last article is delivered or at a stage when a few articles remain in the container which may be desirable in the case of tickets. For charging the container the same may be provided with a removable door 51 having a handle 52 and provided with cross bars 53 adapted to engage behind angular lugs or hooks 54, the door being removed when desired by simply lifting the bars out of engagement with said hooks. To avoid the necessity of manually holding down the cross member 5 and base plate 3 when charging the container, the said cross member may be provided with a slot 55 adapted to be engaged by a sliding bolt 56, this engagement being released after charging so that the feed action of the articles may take place as above described. When no coin mechanism is provided the trip lever 28 may be operated by an attendant from the exterior of the machine by any convenient means.

I do not limit myself to the exact construction and arrangement of parts hereinbefore described and illustrated since the same may be varied within limits defined by the following claims without departing from the spirit of the invention.

What I claim as my invention and desire to secure by Letters Patent of the United States is:—

1. In a vending machine the combination with a support for a stack of articles, of ejecting means comprising a pair of intergeared rotary elements, both operating in a common horizontal plane, a projection on each of said elements extending at right angles to the plane thereof and means for successively presenting said articles to the projections for ejection thereby.

2. In a vending machine the combination with a support for a stack of articles, of ejecting means comprising a pair of intergeared disks both operating in a common horizontal plane, a projection on each of said disks extending at right angles to the plane thereof, means for moving said support to successively present the articles to said projections and means for rotating said disks in opposite directions to cause the projections thereon to eject an article.

3. In a vending machine the combination with a support for a stack of articles, of ejecting means located above said stack comprising a pair of intergeared disks rotatable in opposite directions and both operating in a common horizontal plane, a pin adjustably secured adjacent the periphery of each disk and extending at right angles to the plane thereof, and means for successively presenting the articles to said pins for ejection thereby.

4. In a vending machine the combination with a support for a stack of articles, of ejecting means comprising a pair of intergeared disks, both operating in a common horizontal plane, a plurality of pins adjustably mounted adjacent the periphery of each disk and extending at right angles to the plane thereof, means for raising said support to successively present the articles to said pins and means for rotating the disks in opposite directions to cause the pins to engage and eject the uppermost article of the stack.

5. In a vending machine the combination of a support for a stack of articles comprising a vertically movable loaded platform, a guide therefor constituting also a discharge aperture, ejecting means comprising a pair of intergeared rotary elements located adjacent the discharge aperture and both operating in a common horizontal plane, a projection on each of said elements extending at right angles to the plane thereof, means whereby said platform is raised under the action of its load to successively present the articles to said projections, and means for rotating said elements to cause the projections to engage and eject an article through the discharge aperture.

In witness whereof I have signed this specification in the presence of two witnesses.

FOSTER JAMES PRICE.

Witnesses:
A. J. HADDAN,
A. MORRILL.

---

Copies of this patent may be obtained for five cents each, by addressing the "Commissioner of Patents, Washington, D. C."